(12) United States Patent
Lerner et al.

(10) Patent No.: US 11,587,104 B2
(45) Date of Patent: *Feb. 21, 2023

(54) TRANSACTION PROCESSING SYSTEM

(71) Applicant: Groupon, Inc., Chicago, IL (US)

(72) Inventors: Yishai Lerner, San Francisco, CA (US); Mihir Shah, San Francisco, CA (US); Gene Alston, Burlingame, CA (US); Ben Kim, Sunnyvale, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,613

(22) Filed: Dec. 9, 2020

(65) Prior Publication Data

US 2021/0166254 A1 Jun. 3, 2021

Related U.S. Application Data

(63) Continuation of application No. 13/752,088, filed on Jan. 28, 2013, now Pat. No. 10,891,641.

(60) Provisional application No. 61/591,777, filed on Jan. 27, 2012.

(51) Int. Cl.
  *G06Q 30/02* (2012.01)
  *G06Q 30/0207* (2023.01)
  *G06Q 20/38* (2012.01)

(52) U.S. Cl.
  CPC ....... *G06Q 30/0207* (2013.01); *G06Q 20/387* (2013.01)

(58) Field of Classification Search
  CPC .................................................. G06Q 30/0207
  See application file for complete search history.

(56) References Cited

U.S. PATENT DOCUMENTS

| | | | | |
|---|---|---|---|---|
| 7,844,490 | B2 * | 11/2010 | Patterson | ........... G06Q 30/0211 705/14.24 |
| 8,260,662 | B2 | 9/2012 | Kaplan | |
| 2002/0062249 | A1 | 5/2002 | Iannacci | |
| 2009/0036103 | A1 * | 2/2009 | Byerley | ............. G06Q 20/3223 455/414.1 |
| 2010/0174596 | A1 * | 7/2010 | Gilman | .................... G07G 1/14 705/14.23 |
| 2010/0191652 | A1 * | 7/2010 | Eckert | ................ G06Q 20/3674 705/14.65 |
| 2010/0312636 | A1 * | 12/2010 | Coulter | .................. G06Q 20/42 705/44 |
| 2011/0022448 | A1 | 1/2011 | Strock | |

(Continued)

*Primary Examiner* — Azam A Ansari
(74) *Attorney, Agent, or Firm* — Alston & Bird LLP

(57) ABSTRACT

The transaction processing system and method provide an efficient and effective way to authorize promotion redemption. The transaction processing system may receive an indication of a request for authorization, the indication comprising a merchant identifier, an account number, and a transaction amount. The transaction processing system may determine whether the request for authorization corresponds to a promotion. The system may further transmit a transaction authorization based on whether the request for authorization corresponds to the promotion. The transaction processing system may cause a promotion database to designate the promotion as redeemed. In this fashion, the transaction processing system improves the consumer experience and minimizes the transaction time needed to identify and redeem a promotion.

20 Claims, 11 Drawing Sheets

(56) References Cited

U.S. PATENT DOCUMENTS

| | | |
|---|---|---|
| 2011/0087530 A1 | 4/2011 | Fordyce et al. |
| 2011/0231321 A1 | 9/2011 | Milne |
| 2013/0117087 A1* | 5/2013 | Coppinger ......... G06Q 30/0207 |
| | | 705/14.27 |
| 2013/0144700 A1 | 6/2013 | Vandeburg et al. |
| 2013/0346170 A1 | 12/2013 | Epstein et al. |
| 2014/0025460 A1 | 1/2014 | Knowles et al. |

* cited by examiner

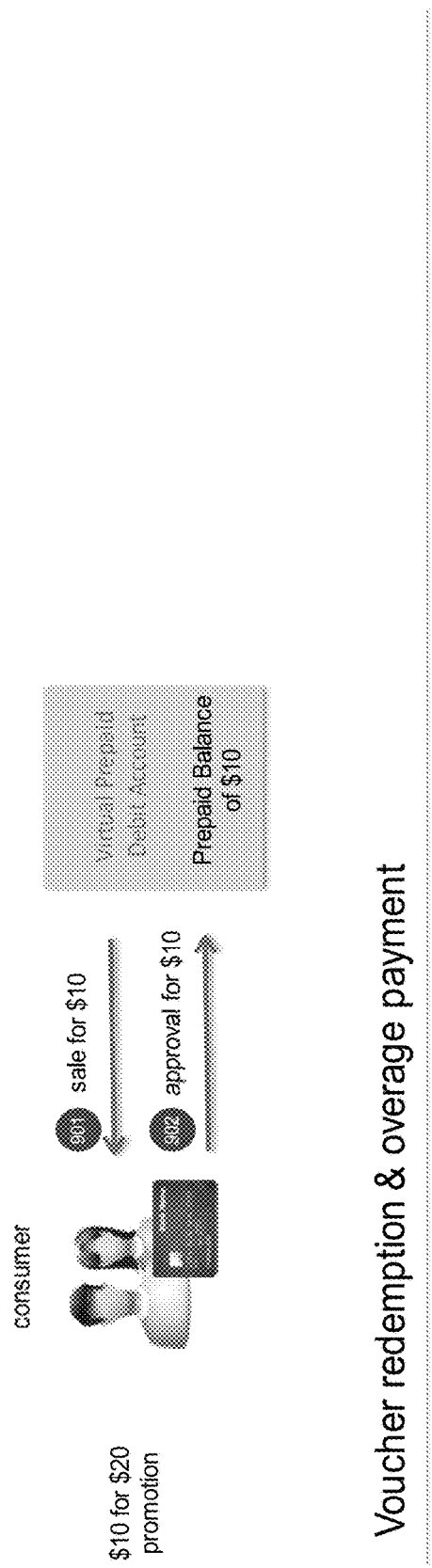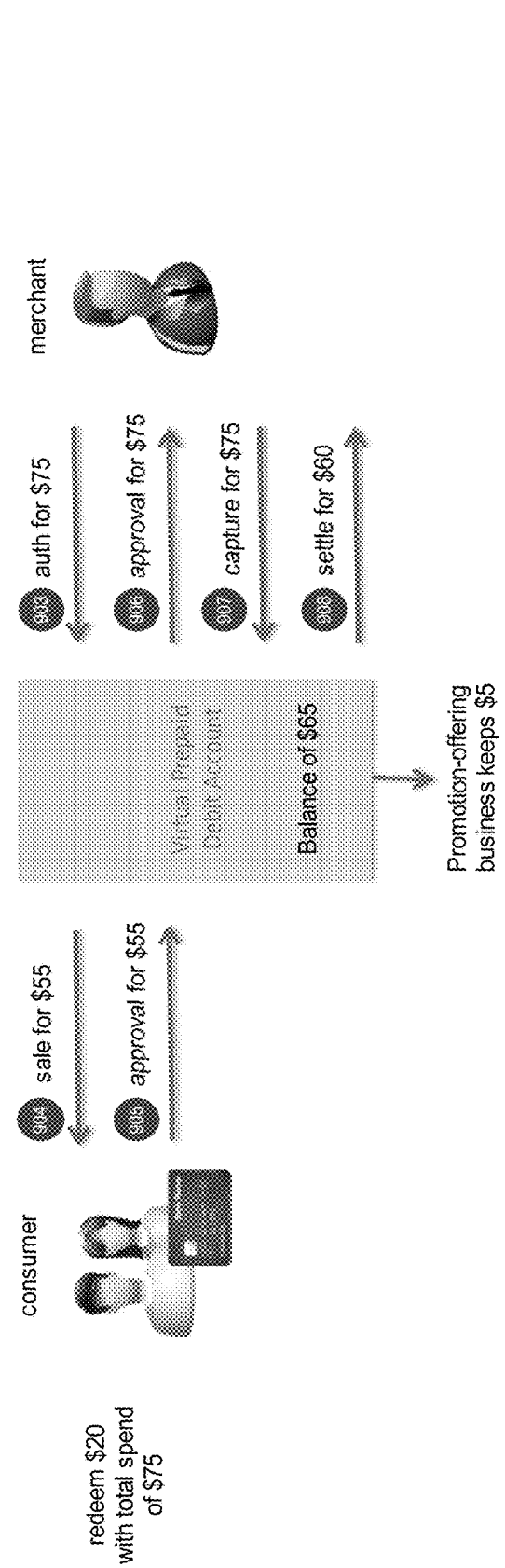
Fig. 9

TRANSACTION PROCESSING SYSTEM

CROSS-REFERENCE TO RELATED APPLICATIONS

This application is a continuation of and claims priority to U.S. patent application Ser. No. 13/752,088, titled "TRANSACTION PROCESSING SYSTEM," and filed Jan. 28, 2013, which claims priority to U.S. Provisional Patent Application No. 61/591,777, filed Jan. 27, 2012, the contents of which are hereby incorporated herein by reference in their entirety.

TECHNICAL FIELD

The present description relates to processing merchant transactions. This description more specifically relates to creating a promotion associated with a product or a service, and redeeming the promotion.

BACKGROUND

Merchants frequently wish to offer promotions to consumers. However, the process of redeeming a promotion during a transaction often adds significant delay to the transaction, detracting from the consumer experience and potentially making the promotion less enticing. Current methods do not provide merchants with a way to quickly and efficiently validate promotions during a transaction. Instead, merchants currently use cumbersome manual processes to identify promotions and to determine a consumer's eligibility to redeem the promotions.

BRIEF SUMMARY

A transaction processing method and apparatus are provided for authorizing promotion redemption. In addition, a method and apparatus are provided for managing a promotion database accessible over a financial network. Finally, a method and apparatus are provided for use by merchants to receive transaction authorizations regarding promotion redemption requests.

In one example embodiment, a method is provided that receives an indication of a request for authorization, the indication comprising transaction information (e.g., a merchant identifier, an account number, and a transaction amount). The method may determine whether the request for authorization corresponds to a promotion, and may further transmit a transaction authorization based on whether the request for authorization corresponds to the promotion. The method may cause a promotion database to designate the promotion as redeemed.

In one embodiment, determining whether the request for authorization corresponds to a promotion is based on the transaction information, such as a merchant identifier, an account number, or a transaction amount. In another embodiment, causing a promotion database to designate the promotion as redeemed comprises modifying a redemption field associated with the promotion in the promotion database. In another embodiment, modifying the redemption field associated with the promotion comprises causing the redemption field associated with the promotion to be decremented. In yet another embodiment, causing a promotion database to designate the promotion as redeemed comprises causing removal of a correlation of the merchant identifier, account number, or transaction amount to the promotion in the promotion database. In another embodiment, causing a promotion database to designate the promotion as redeemed comprises causing removal of a promotion identifier correlated with the promotion from the promotion database. In another embodiment, determining whether the request for authorization corresponds to a promotion comprises determining whether a redemption field associated with the promotion identifier designates the promotion as redeemed.

In another embodiment, determining whether the request for authorization corresponds to the promotion comprises determining whether the transaction amount is less than a predetermined amount. In another embodiment, in response to determining that the transaction amount is less than the predetermined amount, the method may determine whether the transaction amount is associated with the promotion in the promotion database. In a further embodiment, in response to determining that the transaction amount is less than the predetermined amount, the method may determine whether the transaction amount and the merchant identifier are associated with the promotion in the promotion database. In yet another embodiment, determining whether the request for authorization corresponds to the promotion may comprise determining whether the account number is associated with the promotion in the promotion database.

In another embodiment of the method, determining whether the request for authorization corresponds to the promotion may comprise determining whether the merchant identifier and the account number are associated with the promotion in the promotion database. Alternatively, determining whether the request for authorization corresponds to the promotion may comprise determining whether the account number and the transaction amount are associated with the promotion in the promotion database.

In one embodiment, in response to determining that the request for authorization corresponds to the promotion, the method may apply the promotion to the transaction amount and calculate a remaining balance. Accordingly, the method may further include charging the remaining balance to a consumer account. In one embodiment, the promotion may comprise an offer for a consumer to receive a discount, a rebate, or a reward. In another embodiment, the request for authorization comprises a request to redeem the promotion. In another embodiment, the account number comprises a credit card number, a debit card number, a charge card number, or a loyalty card number.

In another example embodiment, an apparatus is provided for authorizing promotion redemption, the apparatus comprising at least one processor and at least one memory including computer program code, the at least one memory and the computer program code configured to, with the at least one processor, cause the apparatus to receive an indication of a request for authorization of a transaction, the indication comprising a merchant identifier, an account number, and a transaction amount. The at least one memory and the computer program code are further configured to, with the at least one processor, cause the apparatus to determine whether the request for authorization corresponds to a promotion, and transmit a transaction authorization based on whether the request for authorization corresponds to the promotion. The at least one memory and the computer program code are further configured to, with the at least one processor, cause the apparatus to cause a promotion database to designate the promotion as redeemed.

In one embodiment, the at least one memory and the computer program code are further configured to, with the at least one processor, cause the apparatus to determine whether the request for authorization corresponds to a promotion based on the merchant identifier, the account number, or the transaction amount. In another embodiment, causing a promotion database to designate the promotion as redeemed comprises causing modification of a redemption field associated with the promotion in the promotion database. In another embodiment, causing modification of the redemption field associated with the promotion comprises causing the redemption field associated with the promotion to be decremented. In yet another embodiment, causing a promotion database to designate the promotion as redeemed comprises causing removal of a correlation of the merchant identifier, account number, or transaction amount to the promotion in the promotion database. In another embodiment, causing a promotion database to designate the promotion as redeemed comprises causing removal of a promotion identifier correlated with the promotion from the promotion database. In another embodiment, determining whether the request for authorization corresponds to a promotion comprises determining whether a redemption field associated with the promotion identifier designates the promotion as redeemed.

In one embodiment, determining whether the request for authorization corresponds to the promotion comprises determining whether the transaction amount is less than a predetermined amount. In another embodiment, in response to determining that the transaction amount is less than the predetermined amount, the at least one memory and the computer program code are further configured to, with the at least one processor, cause the apparatus to determine whether the transaction amount is associated with the promotion in the promotion database. In a further embodiment, in response to determining that the transaction amount is less than the predetermined amount, the at least one memory and the computer program code are further configured to, with the at least one processor, cause the apparatus to determine whether the transaction amount and the merchant identifier are associated with the promotion in the promotion database. In yet another embodiment, determining whether the request for authorization corresponds to the promotion may comprise determining whether the account number is associated with the promotion in the promotion database.

In another embodiment of the apparatus, determining whether the request for authorization corresponds to the promotion may comprise determining whether the merchant identifier and the account number are associated with the promotion in the promotion database. Alternatively, determining whether the request for authorization corresponds to the promotion may comprise determining whether the account number and the transaction amount are associated with the promotion in the promotion database.

In one embodiment, in response to determining that the request for authorization corresponds to the promotion, the at least one memory and the computer program code are further configured to, with the at least one processor, cause the apparatus to apply the promotion to the transaction amount and calculate a remaining balance. Accordingly, the at least one memory and the computer program code are further configured to, with the at least one processor, cause the apparatus to charge the remaining balance to a consumer account. In one embodiment, the promotion may comprise an offer for a consumer to receive a discount, a rebate, or a reward. In another embodiment, the transaction may comprise a request to redeem the promotion. In another embodiment, the account number may comprise a credit card number, a debit card number, a charge card number, or a loyalty card number.

In another embodiment, a method is provided for managing a promotion database accessible over a financial network. The method may receive input data comprising an account number, a transaction amount, a merchant identifier, or a consumer identifier. The method may further generate a promotion identifier indicative of a promotion. The method may correlate the promotion identifier to the account number, the transaction amount, the merchant identifier, or the consumer identifier, and store the promotion identifier, the account number, the transaction amount, the merchant identifier, or the consumer identifier in the promotion database.

In one embodiment, the method may store a redemption field in the promotion database, wherein the redemption field is associated with the stored promotion identifier, account number, transaction amount, merchant identifier, or consumer identifier.

In another embodiment, an apparatus is provided for managing a promotion database accessible over a financial network. The apparatus includes at least one processor and at least one memory including computer program code, the at least one memory and the computer program code configured to, with the at least one processor, cause the apparatus to receive input data comprising an account number, a transaction amount, a merchant identifier, or a consumer identifier. The at least one memory and the computer program code are further configured to, with the at least one processor, cause the apparatus to generate a promotion identifier indicative of a promotion, correlate the promotion identifier to the account number, the transaction amount, the merchant identifier, or the consumer identifier and store the promotion identifier, the account number, the transaction amount, the merchant identifier, or the consumer identifier in the promotion database.

In one embodiment, the at least one memory and the computer program code are further configured to, with the at least one processor, cause the apparatus to store a redemption field in the promotion database, wherein the redemption field is associated with the stored promotion identifier, account number, transaction amount, merchant identifier, or consumer identifier.

In another example embodiment, a method is provided that receives, from a consumer, a request to redeem a promotion. The method generates, by a point of sale terminal, a request for authorization based on the request to redeem the promotion, the request for authorization including a merchant identifier, an account number and a transaction amount. The method further transmits the request for authorization, wherein the request for authorization is configured for interpretation by a promotion identifying module, and receives a transaction authorization indicating acceptance or declination of the request for authorization.

In one embodiment, the method may further include accepting or declining the request to redeem the promotion. In another embodiment, generating the request for authorization may comprise generating the account number based on the request to redeem the promotion, and generating the transaction amount based on the promotion. In yet another embodiment, generating the account number based on the request to redeem the promotion may comprise interpreting data received from scanning a credit card, a debit card, a charge card, or a loyalty card, or capturing input received via a user interface. In another embodiment, generating the request for authorization may comprise generating the account number based on the request to redeem the promotion, and generating the transaction amount based on a product or service. In this regard, generating the account number based on the request to redeem the promotion may comprise interpreting data received by scanning a credit card, a debit card, a charge card, or a loyalty card, or capturing input received via a user interface.

In another example embodiment, an apparatus is provided, the apparatus comprising at least one processor and at least one memory including computer program code, the at least one memory and the computer program code configured to, with the at least one processor, cause the apparatus to generate, by a point of sale terminal, a request for authorization based on a request to redeem a promotion, the request for authorization including a merchant identifier, an account number and a transaction amount, transmit the request for authorization to a remote device, and receive a transaction authorization indicating acceptance or declination of the request for authorization.

In one embodiment, the memory further includes computer program code configured to, when executed by the processor, cause the apparatus to accept or decline the request to redeem the promotion. In another embodiment, generating the request for authorization may comprise generating the account number based on the request to redeem the promotion, and generating the transaction amount based on the promotion. In yet another embodiment, generating the number based on the request may comprise interpreting data received from scanning a credit card, a debit card, a charge card, or a loyalty card, or capturing input received via a user interface. In another embodiment, generating the request for authorization may comprise generating the account number based on the request to redeem the promotion, and generating the transaction amount based on a product or service. In another embodiment, generating the number based on the request may comprise interpreting data received from scanning a credit card, a debit card, a charge card, or a loyalty card, or capturing input received via a user interface.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The transaction processing system may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 9 illustrates a practical example of the transaction processing system according to some embodiments.

DETAILED DESCRIPTION

Figure 1A:
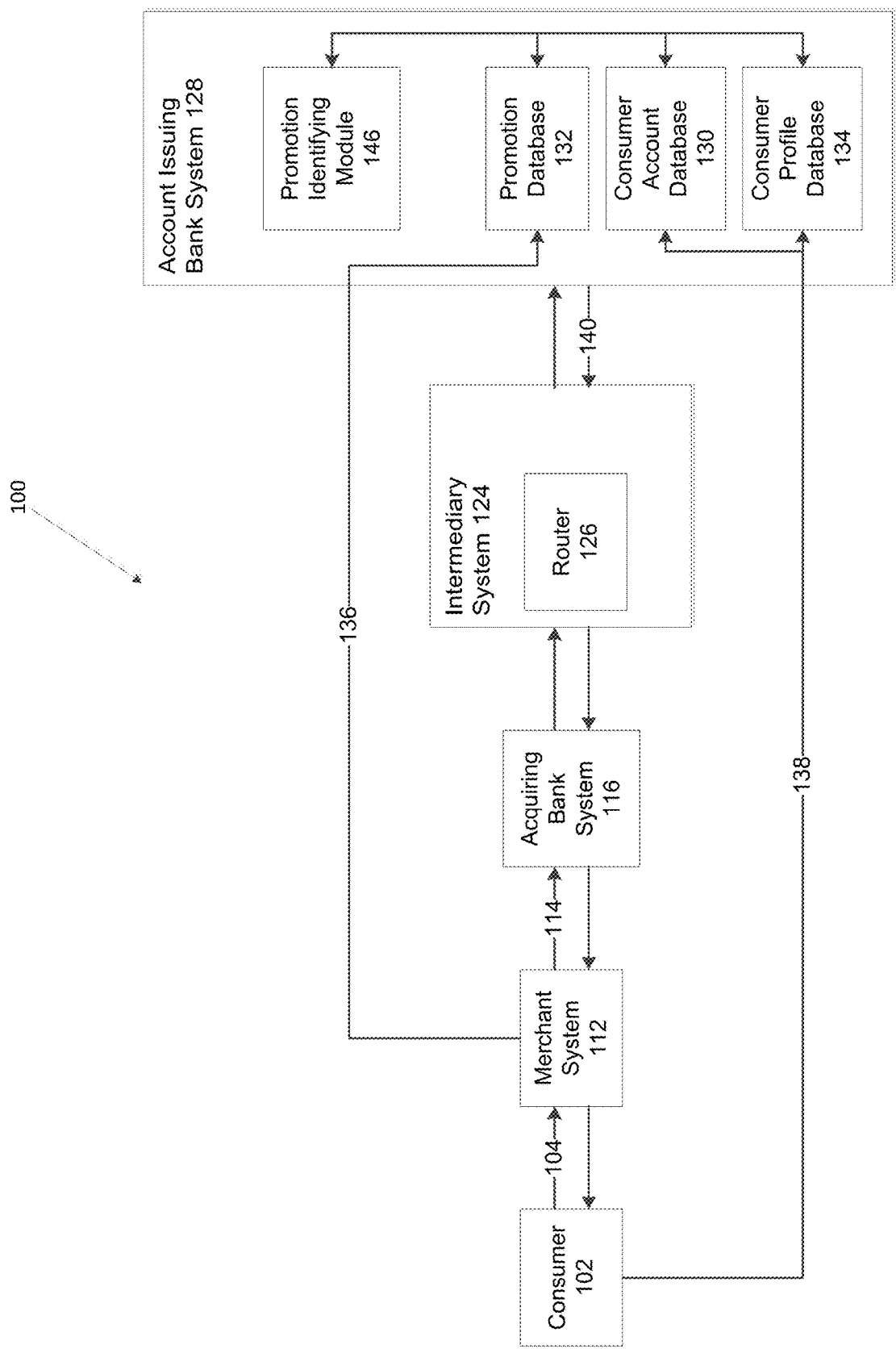
FIG. 1a shows a representation of the transaction processing system processing a credit card transaction according to an example embodiment.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different, or fewer components may be provided.

The transaction processing system collects information from merchant interactions with consumers, and uses the collected information to reduce the transaction time taken to: determine whether to apply a promotion (such as a discount, reward, coupon, rebate, pre-purchased merchant credit, or other deal intended to increase demand and/or differentiate a product, service, or merchant) to a transaction; determine whether to authorize the transaction for a specific product or specific service; and/or assist in determining the eligibility of the consumer for a promotion. The transaction processing system may expedite transactions by using a merchant's point of sale terminal to send a request for authorization to verify the applicability of a promotion to a consumer's purchase and to redeem the promotion.

In a first embodiment, the merchant's point of sale terminal may be used to send the request for authorization comprising transaction information such as, for example, a consumer's account number and a transaction value that may alone, or in combination, identify a promotion (i.e., the transaction value acts as a promotion identifier). The transaction processing system may identify the request for authorization based on this promotion identifier, determine whether the consumer is authorized to redeem the promotion, and authorize the transaction if the consumer is authorized to redeem the promotion. As a result, the merchant using the point of sale terminal can determine whether the consumer may redeem the promotion.

In a second embodiment, the consumer may present an account number to the merchant for authorization using, for example, a loyalty card or a virtual representation of the same (e.g., a mobile device supported barcode, etc.). In this embodiment, the merchant's point of sale terminal may be used to send a request for authorization with the loyalty card number (i.e., an account number) and a predefined transaction value that identifies the promotion. The loyalty card number enables the card system to route the request to a promotion identifying module (perhaps hosted by a remote server such as that used by a credit issuing bank) that is configured to access a promotion database when making the authorization determination.

In a third embodiment, the merchant's point of sale terminal may be used to send a request for authorization with transaction information such as an account number and a transaction value. In this embodiment, the account number identifies the promotion and the transaction amount simply identifies the actual cost of the transaction. In particular, when the merchant's point of sale terminal is used to transmit the request for authorization, the account number acts as a promotion identifier. A transaction authorization can be sent to the point of sale terminal for use by the merchant. In some embodiments, payment for the transaction can also be completed in response to the request for authorization without the need for a subsequent payment transaction.

Turning now to FIG. 1a, a representation of the transaction processing system 100 is shown processing a request for authorization comprising transaction information. In the depicted embodiment, the transaction information includes an account number, which for illustration purposes is a credit card number. However, as will be apparent to one of ordinary skill in the art, any account number may be used in connection with the inventive concepts herein described such as, for example, a debit card number, a loyalty card number, a virtual account number, a savings or checking account number, a transaction number, and the like.

Figure 1B:
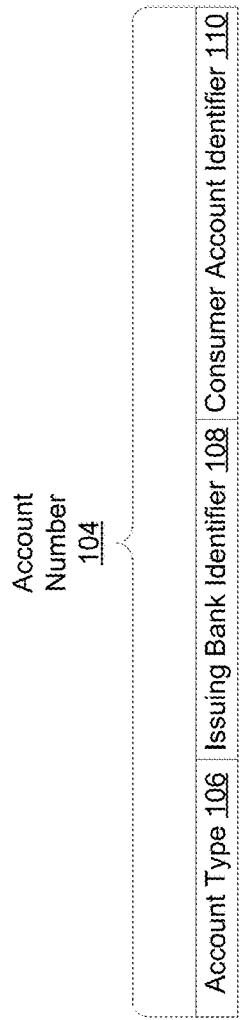
FIG. 1b shows constituent elements comprising an account number according to an example embodiment.

When a consumer 102 (e.g., a customer or a customer's device, such as a mobile terminal or a computer) uses a credit card to complete a transaction, the consumer 102 presents the credit card number to the merchant to complete the transaction. The credit card includes an account number 104, which, as shown in FIG. 1b, identifies the type of account 106, the account issuing bank 108, and the consumer's account 110 at the issuing bank. The merchant (e.g., merchant system 112) inputs the account number 104 into a point of sale terminal (such as by scanning the credit card through a magnetic or optical scanner to retrieve information from the card or by manually inputting the account number using a user interface on the machine, such as a keypad), and inputs the transaction amount into the point of sale terminal (e.g., using the keypad in the merchant system 112 or scanning a price or UPC tag for a product or service).

Figure 1C:
FIG. 1c shows constituent elements comprising a request for authorization according to an example embodiment.

In the depicted embodiment, the point of sale terminal then sends a request for authorization 114 to the acquiring bank system 116 over a financial network. The acquiring bank system 116 is the bank that handles the merchant's credit-card account, in order to obtain authorization for the transaction. As shown in FIG. 1c, the request for authorization 114 may include transaction information such as, for example, a merchant identifier 118 (or other type of transaction identifier), the account number 104 (here, a credit card number), optionally a reward logic identifier 120, and a transaction amount 122. In other embodiments, other types of transaction information may be used. In some embodiments, the request for authorization 114 may additionally include a reward logic identifier 120 that contains additional data that can be used to process a request for authorization or identify a given promotion as discussed in greater detail below.

FIG. 1a illustrates the acquiring bank system 116 forwarding the request for authorization 114 via the financial network to the intermediary system 124, which may use a router 126 to identify an account issuing bank system 128 corresponding to the account number 104 and to forward the request for authorization 114 via the financial network to the account issuing bank system 128. In this regard, each request for authorization may not actually be transmitted to each receiver as a fully-formed request, but may comprise only an indication of the request itself, such as a string of binary information that represents the request and that can be reconstructed into the request (or data that may be interpreted as a request) by a receiving processor or system. Nevertheless, these transmissions, and all other transmissions of a similar kind, will be referred to in more general terms for the sake of clarity.

The account issuing bank system 128 (the bank that issued the account number 104 to the consumer 102) maintains up-to-date information on the consumer's account 130 (e.g., account balance and account status). The account issuing bank system 128 may also include a promotion identifying module 146, a promotion database 132, and a consumer profile database 134. The merchant system 112 may periodically communicate updates to the promotion database 132 via a promotion network that may be separate from the financial network. The consumer 102 may also separately communicate updates 138 to the consumer profile database 134.

In some embodiments, the promotion identifying module 146 may determine whether a request for authorization corresponds to a promotion stored in the promotion database 132 or is otherwise associated with a consumer profile from the consumer profile database 134. While the promotion identifying module 146, the promotion database 132, and the consumer profile database 134 are described in relation to, and as features of, the account issuing bank system 128, this description is merely for illustration purposes. In alternative embodiments, the promotion identifying module 146, the promotion database 132, and the consumer profile database 134 may be resident in the acquiring bank system 128, the card system 124, a promotion network that may be operated, for example, by the promotion-offering business, or any combination thereof.

When the request for authorization comprises transaction information that is not indicative of a promotion (e.g., the account number and the transaction amount are indicative of an ordinary request to authorize a transaction for a transaction amount without reference to any promotion), the promotion identifying module 146 notifies the account issuing bank system 128, which examines the consumer account database 130 of the consumer 102 to determine whether the consumer's account has a sufficient balance (e.g., a credit balance) to cover the proposed transaction. If so, the account issuing bank system 128 transmits a transaction authorization 140 (perhaps containing an authorization code). The transaction authorization 140 is sent back to the acquiring bank system 116 (through the intermediary system 124) and eventually is passed along to the merchant system 112 that sent the request for authorization 114.

Alternatively, when the promotion identifying module 146 determines that the request for authorization is indicative of a promotion, the promotion identifying module 146 identifies which promotion the request for authorization is indicative of, and determines whether the consumer 102 is authorized to redeem the promotion (such as an identified discount associated with a specific product or service). The promotion identifying module 146 then generates a transaction authorization 140 that is sent back to the merchant system 112.

Figure 1D:
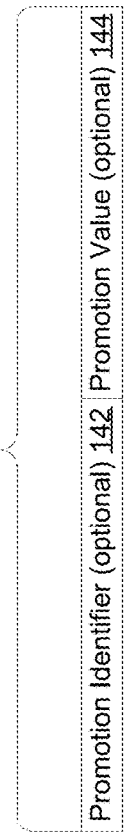
FIG. 1d shows constituent elements of a transaction authorization according to an example embodiment.

In one embodiment, as shown in FIG. 1d, the transaction authorization 140 may optionally include a promotion identifier 142 and a promotion value 144 that identifies a redeemable value amount for the promotion identified by the promotion identifier 142. In another embodiment, the transaction authorization 140 may embody a simple approval or denial message. While the term "transaction authorization" is used herein to encompass the message, signal, or data sent from the promotion identifying module 146 to the merchant system 112, this term should not be construed as covering only "authorized" transactions but rather also encompasses signals or messages where a proposed transaction has been or should be declined.

Various embodiments discussed herein involve the promotion identifier 142 determining whether the request for authorization is indicative of a promotion based, at least in part, on transaction information such as the merchant identifier, the account number, or the transaction amount. In some embodiments, only one of the transaction information values (e.g., the merchant identifier, the account number, or the transaction amount) are used to identify a promotion. However, in other embodiments, various combinations of two or more transaction information values may be used. For example, in one embodiment, a merchant identifier and an account number may be used. In another embodiment, a merchant identifier and a transaction amount may be used. In still other embodiments, a merchant identifier, an account number, and a transaction amount may be used.

In one embodiment, the intermediary system 124 may coordinate the transfer of funds from the account issuing bank system 128, which pays for the transaction and extends credit to the consumer 102, to the acquiring bank system 116, which holds an account in the merchant's name. The actual transfer of money between the acquiring bank system 116 and the account issuing bank system 128, and the actual debiting of the consumer's account 130 may not occur until sometime after authorization of the transaction (e.g., a day or two after the actual transaction date). In the meantime, the account issuing bank system 128 may place a pending charge on the consumer's account 130 and count the transaction against the consumer's remaining available credit limit even though the transaction has not yet cleared.

In the context of processing promotion transactions, the reconciliation for authorization of the promotion may occur contemporaneously with the authorization, or may occur at a later time (such as a day or two after the authorization). In other words, in some embodiments, authorization of a promotion may be provided immediately, but consideration (e.g., payment) for the promotion may be debited from the consumer's account 130 at a later date, allowing a consumer to effectively purchase a promotion at the time of redemption. In other embodiments, a consumer may have pre-purchased the promotion from a third party promotion offering business such that redemption of the promotion causes funds to be transmitted from the promotion offering business to the merchant system either immediately or after some reconciliation period.

The term "account number" as used herein may refer to a physical payment card number (such as a credit card number, debit card number, or charge card number), a loyalty card number (i.e., a number associated with a card that may or may not be used as a payment card), a "virtual" account number, or any other number that may uniquely identify the consumer or the proposed transaction.

In one embodiment, i.e., in credit card applications, the first portion of an account number typically represents the Issuer Identification Number (IIN) and the account issuing bank system 128 that issued the respective account number. The remaining digits are usually allocated by the account issuing bank system 128 to identify individual accounts. In some embodiments, the account issuing bank system 128 is an existing account issuing bank system, such as Visa®, Mastercard®, or Discover®. However, in embodiments in which the account number is a virtual account number, the account number may not be associated with a physical payment card, but instead may be associated with promotions by a promotion-offering business (e.g., Groupon®).

In some embodiments, the promotion-offering business may acquire a range of account numbers from an account issuing bank system 128 (e.g., a block of unissued credit card numbers). The promotion-offering business may thereafter assign each account numbers of the range of account numbers to indicate a specific promotion. For example, account number 1234-1234-1234-1234 may correspond to a promotion for $40 at Acme Nail Salon. This promotion could be sold to a consumer for $20 and the consumer thereafter issued the account number 1234-1234-1234-1234, which would be transmitted by the merchant system in connection with a request for authorization as described in greater detail below.

In one embodiment, the account number may be issued to the consumer following a first transaction between the consumer and the promotion-offering business (e.g., when a consumer uses a PC, mobile phone, or other such device to purchase a promotion, i.e., the $20 for $40 Acme Nail Salon promotion noted above). Such transactions may frequently be completed via a network, such as the Internet. For example, the promotion-offering business may generate an account number during or shortly after this first transaction, and may transmit the account number via the network to the consumer (e.g., to an application running on a consumer's smart phone). Additionally, upon generating the account number, the promotion-offering business may also transmit the account number to a promotion database for correlation with the promotion. The promotion database may be a proprietary database hosted by the promotion-offering business, or alternatively may be a part of an account issuing bank system 128, an intermediary system 124, or an acquiring bank system 116, each of which may be connected to a financial network that may periodically receive requests for authorization of transactions.

In another embodiment, the account number is not generated at the time of the first transaction, but instead may be generated and transmitted to the consumer and the promotion database at or shortly before the consumer attempts to redeem the promotion. For instance, using a mobile phone (e.g., a smart phone) running a software application, the consumer may transmit a request to redeem the promotion (i.e., perhaps after pressing a "redeem" soft key or virtual button presented by the application), in response to which the promotion-offering business (i.e., via its network circuitry or processor) generates the account number and transmits it to both the consumer's mobile phone and the promotion database. Thereafter, the account number may be displayed on the consumer's mobile phone in alphanumeric text format, barcode format, QR code format, or the like.

Such displayed account number may be presented to the merchant point of sale terminal (i.e., part of the merchant system 112), which may employ an optical reader, scanner, or similar device to read and interpret the account number. Such account number may be embedded within, encrypted within, or otherwise embodied by a request for authorization transmitted by the merchant system 112.

Because the account numbers need not be until assigned shortly before redemption, in some embodiments each account number may be assigned to a particular promotion for only a short duration (such as 30 minutes from when the consumer presses an icon to redeem the promotion), after which the account number is redeemed and made available to be reassigned to another consumer who has purchased a promotion. Each account number may be unique to a single promotion, or alternatively account numbers may be assigned to multiple promotions (each perhaps associated with a different merchant) simultaneously, wherein in any potential request for authorization, the merchant identifier 118 may be used to differentiate promotions having the same account number. Using these and other similar assigning methods, the promotion-offering business need not maintain account numbers for each consumer that has purchased each promotion. Rather, the promotion-offering business need only acquire a relatively small number of account numbers from the account issuing banking system 128 and may still uniquely identify each promotion.

Figure 2:
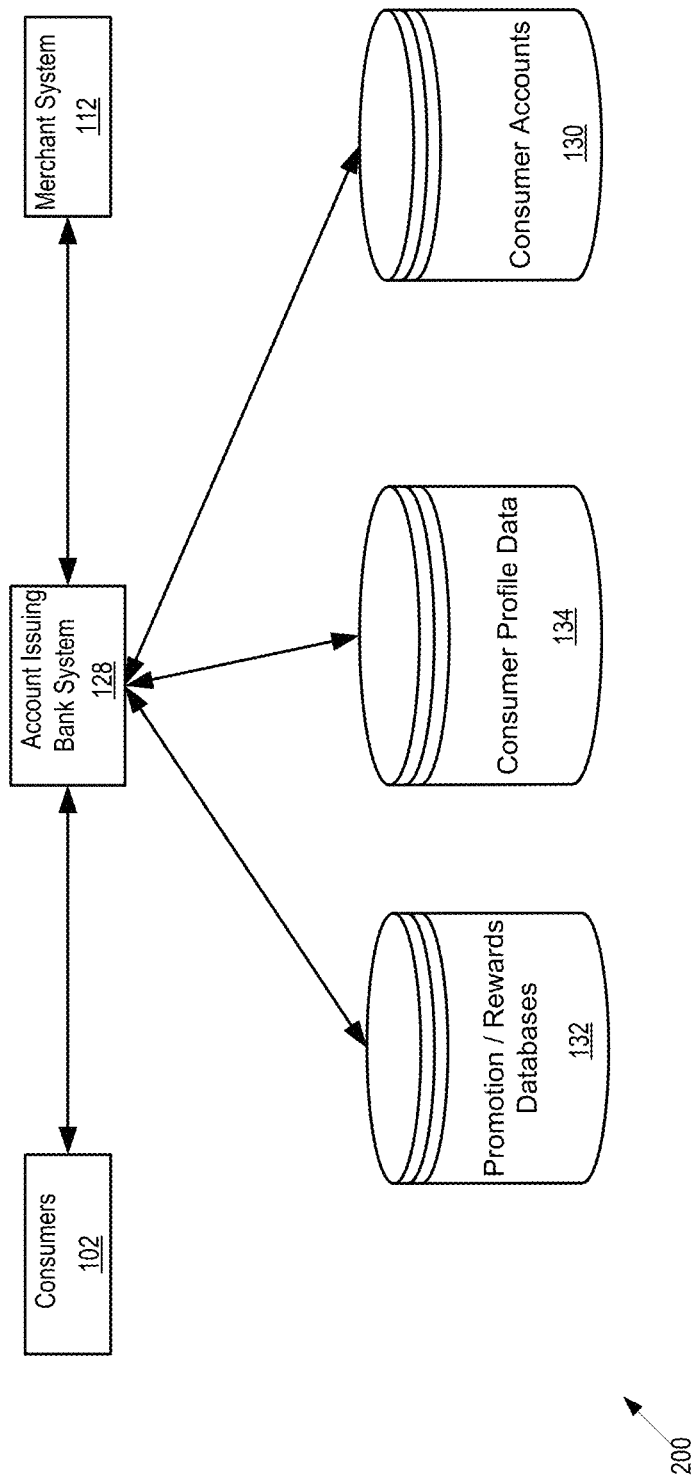
FIG. 2 shows a block diagram of an account issuing bank system according to an example embodiment.

FIG. 2 shows a block diagram 200 of an account issuing bank system 128. While FIG. 2 illustrates transaction processing functionality resident in the account issuing bank system, the functionality described in FIG. 2 and FIG. 4 may additionally or alternatively be found in the acquiring bank system 116, the intermediary system 124, a combination thereof, or in a third party system. The account issuing bank system 128 communicates with consumers 102 and merchant systems 112 to exchange information, such as updates to consumer accounts 130, promotion database 132, and consumer profile data 134. The merchant systems 112 and/or third party promotion-offering businesses may provide updates for the promotions database 132. The consumers 102, as the result of interactions with the account issuing bank 128, may update the consumer profile data 134 and consumer accounts 130. The account issuing bank system 128 may use inputs from the consumers 102 and the merchants systems 112 to efficiently correlate promotions with the consumers' 102 eligibility to receive and/or redeem promotions.

Figure 3A:
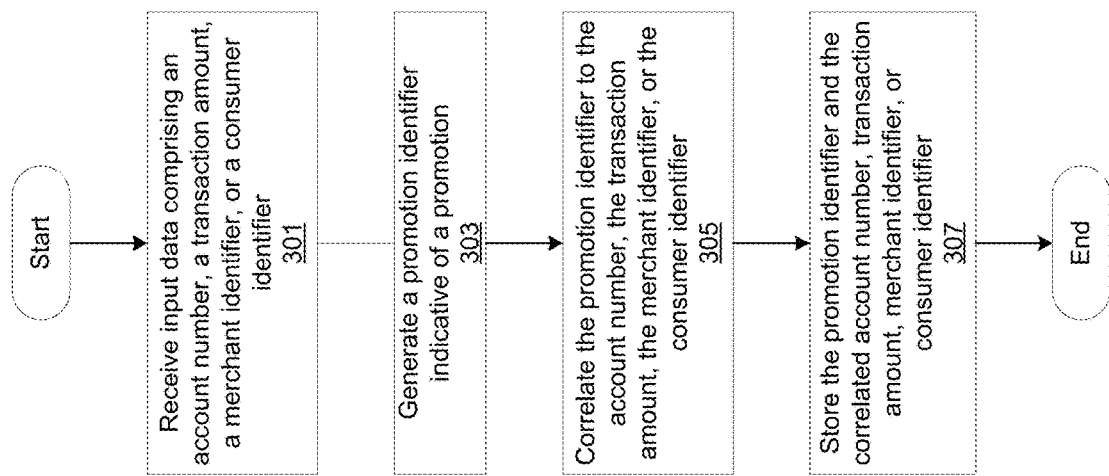
FIG. 3a illustrates operations for managing a promotion database according to some example embodiments.

To facilitate the various embodiments described herein, the transaction processing system relies upon accessing the promotion database 132. FIG. 3a illustrates operations, from the perspective of a device, such as the promotion identifying module 146, for managing the promotion database 132. The promotion database may be hosted by the promotion-offering business (i.e., by a server or other processing circuitry), the account issuing bank system 128, an intermediary system 124, the acquiring bank system 116, or merchant system 112.

During the foregoing description of FIG. 3a, as well as FIGS. 3b-10, reference may periodically be made to items described above with respect to FIG. 1. In this regard, like reference numerals are intended to refer to like items.

Referring now to FIG. 3a, the device, such as the promotion identifying module 146, may receive input data, at operation 301, comprising an account number, a transaction amount, a merchant identifier, or a consumer identifier. In this regard, the input data, the device, such as the promotion identifying module 146, may generate a promotion identifier indicative of a promotion at operation 303. After generating a promotion identifier, the device, such as promotion identifying module 146, may correlate the promotion identifier to the account number, the transaction amount, the merchant identifier, or the consumer identifier at operation 305. The device, such as promotion identifying module 146, may store the promotion identifier and the correlated account number, transaction amount, merchant identifier, or consumer identifier at operation 307.

As will be described in greater detail below in connection with redemption, a promotion may be identified using any of the above correlated variables, thus enabling a query of the promotion database 132 to evaluate whether any particular request for authorization may correspond to the promotion. In addition, each promotion identifier may be associated with a redemption field that may be used to indicate whether the promotion is eligible for redemption.

For example, in one embodiment, the promotion database may be queried to determine whether a particular consumer is authorized to redeem a particular promotion. In such embodiment, a promotion identifying module 146 may query a redemption field in the promotion database that is associated with a stored promotion identifier, an account number, a transaction amount, a merchant identifier, or a consumer identifier. The redemption field may be used to ensure that promotions are only redeemed an authorized number of times, as discussed below.

Figure 3B:
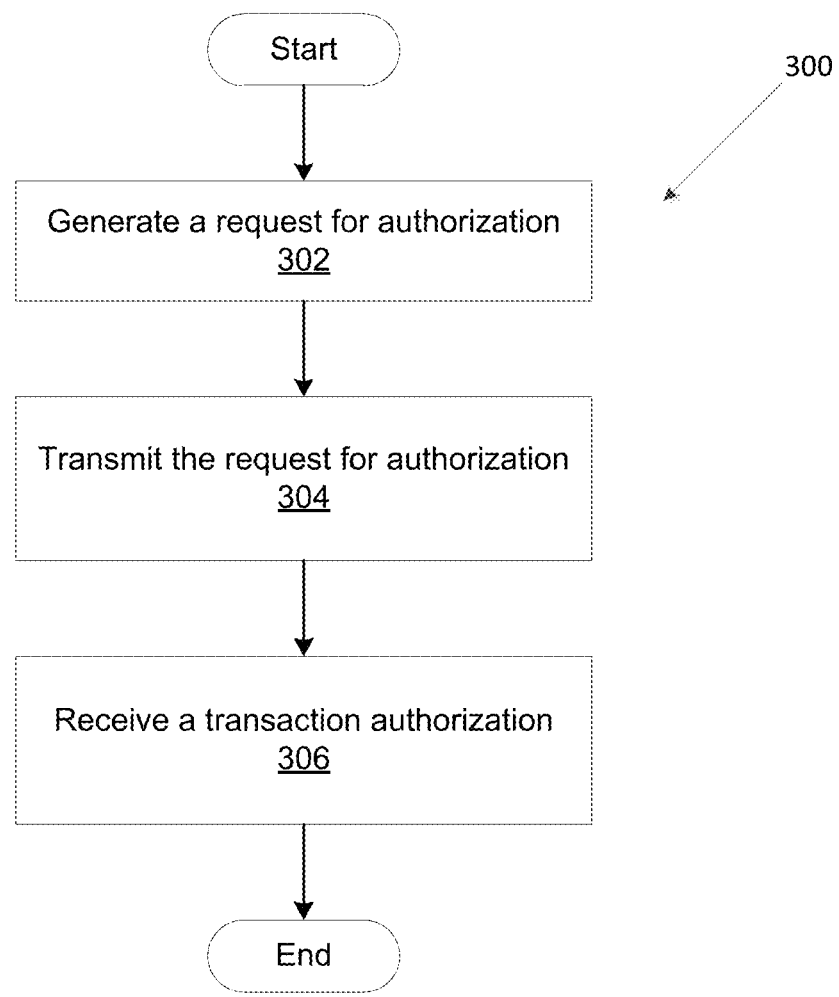
FIG. 3b shows a logic flow used by a point of sale terminal to receive an indication of whether a consumer may redeem a promotion, in accordance with an example embodiment.

FIG. 3b shows a logic flow 300 used by the merchant system 112 to determine whether a consumer may redeem a promotion. The merchant system 112 receives a consumer's account number 104. The account number may include the type of account (e.g., credit account, charge account, debit account, loyalty account), the account issuing bank system 128, and a consumer account number. The merchant system 112 also retrieves a transaction amount 122 that is correlated with the promotion. The retrieval of the transaction amount may be performed manually such as by a store clerk who selects the transaction amount indicative of a desired promotion. Alternatively, the retrieval of the transaction amount may be done at least partly by the merchant system 112. For example, the store clerk may input the type of promotion, and the merchant system may automatically generate an appropriate transaction amount that is associated with the promotion. As another example, the merchant system 112 may scan a barcode, QR code, or other similar representation of an account number presented on a card, printed to paper, or displayed on a mobile phone. The merchant system 112 may use the account number to access a database that includes promotions for a plurality of merchants to determine whether the received transaction amount 122 indicates a promotion for one or more merchants (e.g., merchants may collaborate to offer promotions to their collective consumers).

In some embodiments, once the merchant system 112 determines a transaction amount 122 that indicates a promotion, the merchant system 112 is able to generate a request for authorization including transaction information such as a merchant identifier, an account number, and the transaction amount at operation 302. The merchant system 112 then transmits at operation 304 the request for authorization containing the account number and transaction amount, the latter of which in this embodiment is indicative of the promotion to the acquiring bank 124. The merchant system 112 receives a transaction authorization at operation 306, which indicates whether or not the promotion has been authorized. Based on the transaction authorization, the merchant is able to accept or decline the request to consumer's request to redeem the promotion.

Figure 4:
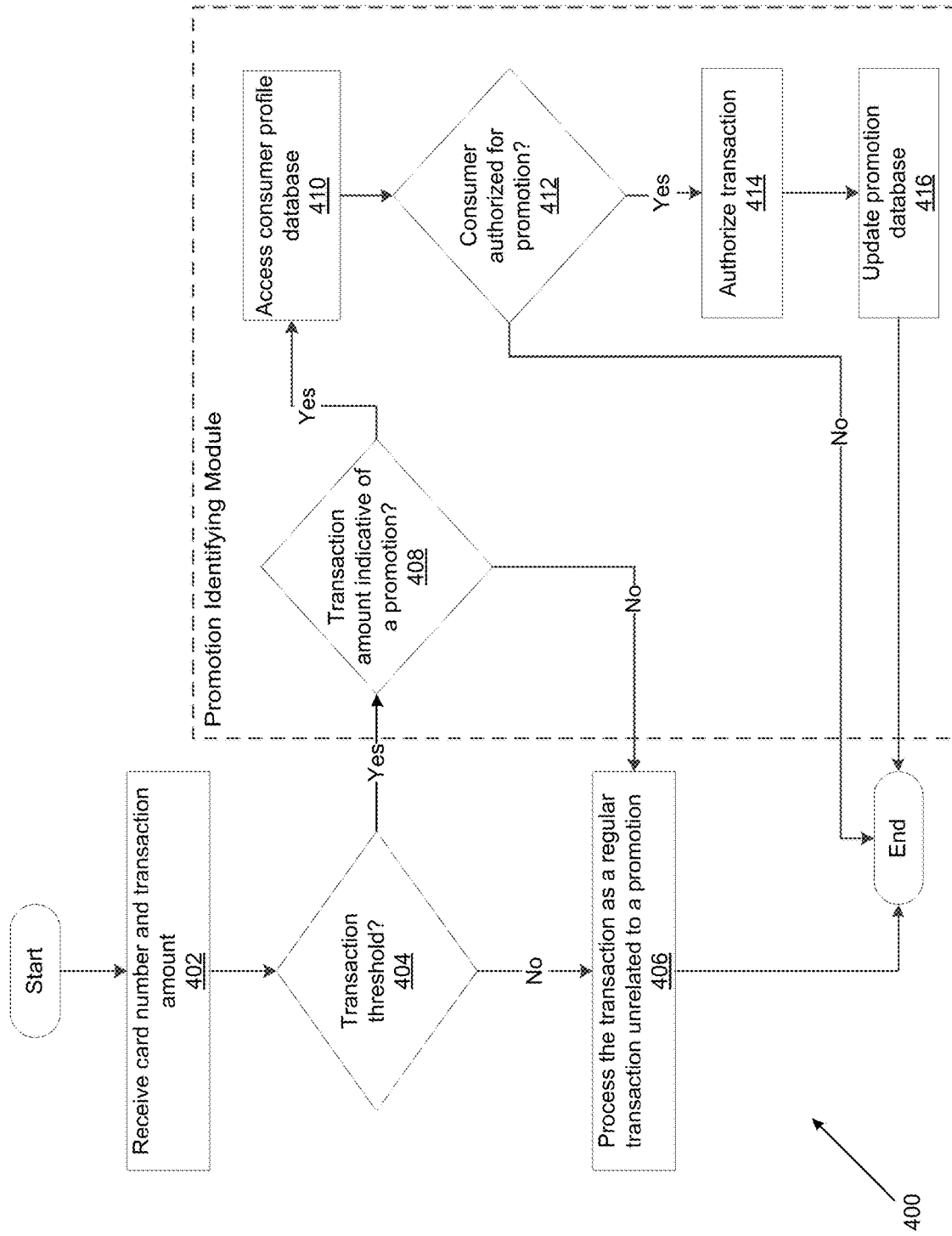
FIG. 4 shows transaction processing logic used by a transaction processing system and operations performed by a promotion identifying module, in accordance with an example embodiment.

FIG. 4 shows a logic flow 400, including transaction processing logic used in conjunction with some embodiments, and operations that are performed by promotion identifying module 146. The transaction processing system 100 may host the transaction processing logic and/or the promotion identifying module 146 in the merchant system 112, the acquiring bank system 116, the card system 124, or the account issuing bank system 128, or any combination thereof. For example, the transaction processing logic may be implemented in the account issuing bank system 128, as illustrated in FIG. 1.

As shown in FIG. 4, the account issuing bank system 128 receives at operation 402 a request for authorization containing transaction information, which here includes an account number 104 and a transaction amount 122. The account issuing bank system 128 may then implement the transaction processing logic, and determine whether the transaction amount 122 satisfies a transaction threshold at operation 404. The transaction threshold may suggest that the transaction amount 122 is below a predetermined amount and is thus indicative of a specific promotion. As one example, transaction amounts below $1.00 may be used to indicate specific promotions. In this regard, a $0.01 transaction amount may indicate a promotion for a $10 discount at the merchant's business, while a $0.02 transaction amount may indicate a promotion for a complementary service at the merchant's business. Of course, the transaction threshold amount may be over $1.00 but under some other dollar amount (e.g., $5.00). When the transaction processing logic is implemented by the account issuing bank system 128, the transaction threshold amount may be configured so that it meets a minimum amount required for the card network to process the transaction as a regular transaction and forward it to the account issuing bank system 128. However, in other embodiments where the transaction processing logic is implemented by the account issuing bank system 128, and in alternative embodiments where the transaction processing logic is implemented by the acquiring bank system 116 or the card system 126, no minimum amount may be needed.

When the transaction amount does not satisfy the transaction threshold (i.e., indicating that the transaction is not correlated to a promotion), the account issuing bank system 128 proceeds to operation 406 and examines the customer account 130 of the consumer 102 to determine whether the customer account 130 has a sufficient credit balance to cover the transaction. If so, the account issuing bank system 128 may authorize the transaction and generate an authorization code 140. The authorization code 140 is sent back to the acquiring bank system 116 (through the card processing system 124), which sends the authorization code 140 as an approval or denial message to the merchant system 112 that sent the request for authorization 114.

When the transaction threshold is satisfied by the transaction amount 122, the account issuing bank system 128 sends the request to the promotion identifying module 146, which analyzes the transaction amount 122 to determine whether the transaction amount indicates a specific promotion at operation 408. This determination may involve querying the promotion database 132, which may store transaction amounts correlated with promotions.

The promotion identifying module 146 may then determine whether the consumer is entitled to the specific promotion or specific reward. For example, the promotion identifying module 146 may access a consumer profile database to determine whether the consumer (e.g., identified by a consumer identifier) is eligible for the promotion at operation 410. The promotion identifying module 146 may determine that the consumer is not eligible for the promotion by determining whether the consumer has satisfied eligibility requirements for the promotion (such as by having previously acquired and/or purchased the promotion) at operation 412. When the consumer is not eligible for the promotion, the promotion identifying module 146 may send back a transaction authorization containing a denial message via the various intermediaries to the merchant system 112 that sent the request for authorization 114. Alternatively, when the consumer is eligible for the promotion, the promotion identifying module 146 may send back a transaction authorization containing an approval message to the merchant system 112 that sent the request for authorization 114 at operation 414.

If a promotion is approved, the promotion identifying module 146 may update the promotion database 132 to designate that the identified promotion has been redeemed at operation 416. Such designation of promotion redemption may be executed in a variety of ways. For example, a redemption field may be modified in the promotion database 132 indicating the status of the promotion. Thus, the promotion may no longer be available for further redemption. Alternatively, the redemption field may be a numerical identifier associated with the promotion in the promotion database, and may be decremented to update the number of redemptions of the promotion that remain. In this embodiment, although a promotion has been redeemed, additional redemptions may still be valid as long as the redemption field is greater than zero. In another alternative implementation, the promotion database may remove the association between the promotion and the particular user or particular transaction. In this embodiment, the promotion may be redeemable, but only by other consumers or for other transactions. Finally, in another embodiment, the promotion may be removed altogether from the promotion database. In this embodiment, the promotion can no longer be redeemed by any consumer, and the promotion identifier associated with the promotion may be reused by the merchant for other promotions. Of course, additional or alternative methods for updating the promotion database 132 are contemplated that may suitably mark the promotion for any subsequent promotion identification operation.

Figure 5:
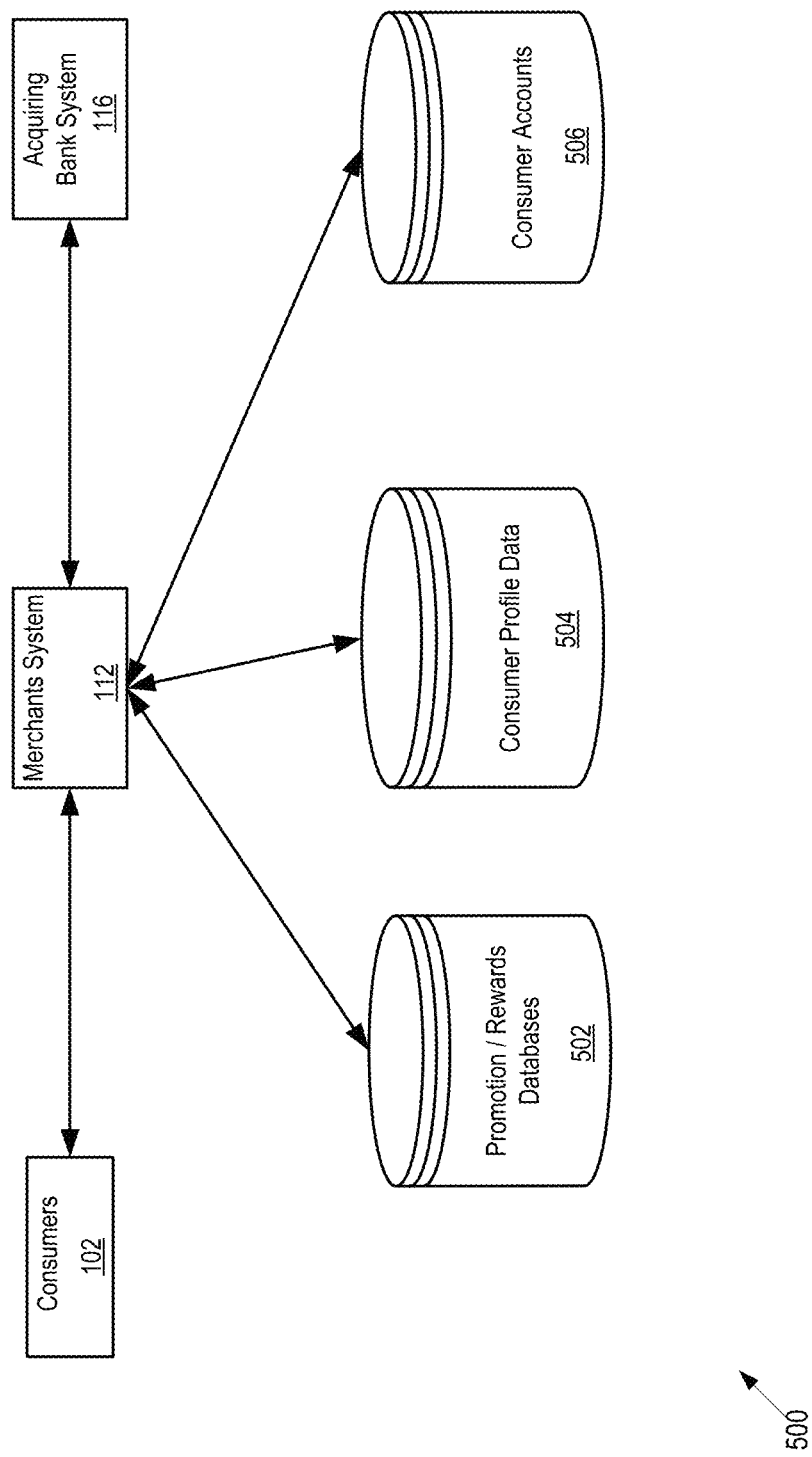
FIG. 5 shows a block diagram for a merchant system according to an example embodiment.

FIG. 5 shows a block diagram 500 for a merchant system 112. The merchant system 112 interacts with consumers 102 who engage the merchant for products or services, and the merchant's acquiring bank system 116 that maintains the merchant's accounts. The merchant system 112 may maintain a local copy and/or different databases of information including a promotions database 502, consumer profile data 504, and consumer accounts 506 for consumers who do business with the merchant 112. The merchant system 112 may update corresponding information (e.g., promotions database 502, consumer profile data 504, and consumers' accounts 506) held by the transaction processing system (which may include the acquiring bank system 116, the card system 124, and/or the account issuing bank system 128, as described in connection with the example of FIG. 4).

Figure 6:
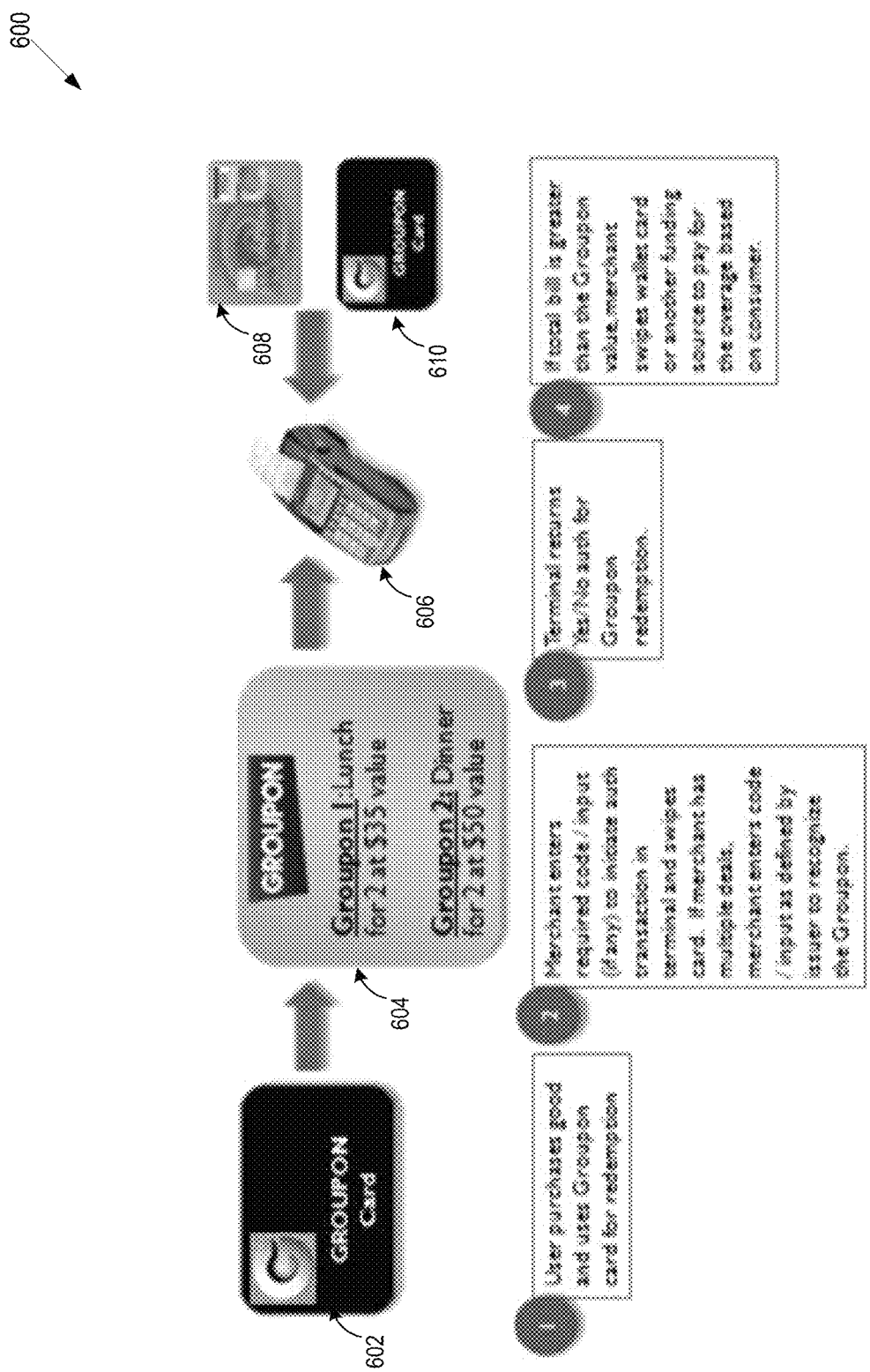
FIG. 6 shows example operations for authorizing promotion redemption, according to some embodiments.

FIG. 6 shows an example embodiment 600 in which the transaction processing system 100 may process a request for authorization based on a loyalty card. As discussed with respect to FIG. 1, the consumer may present a loyalty card to the merchant system 112. The card may be a dual-purpose card in that it may be used for a first use (e.g., as a credit card, a debit card, or a charge card) and for a second use (e.g., as a promotion redemption card). Alternatively, the card may be a single purpose card. For example, a consumer 102 may use a loyalty card (e.g., a Groupon® card) to pay a bill, in which case the loyalty card may be used for this single purpose. Alternatively, the consumer 102 may purchase products or services and also redeem promotions using the loyalty card.

As shown in FIG. 6, the consumer 102 presents the loyalty card to the merchant system 112 at operation 602. The merchant may enter into a point-of-sale system an account number, perhaps by reading a magnetic stripe or scanning a barcode, to initiate an authorization transaction (e.g., a request for authorization). While a physical card is shown the present invention also encompasses "virtual" loyalty cards having account numbers (e.g., barcodes, QR codes, Near Field Communication tags, etc.) that may be presented or displayed by a mobile phone as discussed above.

In one embodiment, the merchant system 112 may distinguish among multiple available promotions by identifying a transaction amount 122 (i.e., the $0.01 transaction amount discussed above) or other promotion code (e.g., rewards logic identifier 120) that is indicative of a promotion for a product or service at operation 604. The point-of-sale device used by the merchant transmits the request for authorization, which includes the account number and the transaction amount 122 or promotion code indicative of the specific promotion to the intermediary system at operation 606. The intermediary system in turn identifies and routes the request for authorization to the account issuing bank system 128 to determine whether the transaction amount or promotion code is indicative of a valid promotion and accordingly whether the consumer is eligible for the promotion. In this regard, because the account issuing bank system 128 may be the party that generates and manages promotions (i.e., Groupon®), it may not be necessary to partner with a third party bank for management of the consumer accounts 130, promotions database 132, or the consumer profile database 134.

Following the authorization of a promotion, the transaction processing system may "continue" the transaction in order to pay for a corresponding product or service. In an instance in which the cost of the product or service is greater than the redemption value of the promotion, the merchant may swipe the loyalty card a second time (or swipe another card) to pay any balance remaining after redemption value of the promotion at operations 608 and 610. Thus, a loyalty card that is issued by a Groupon® member to facilitate redemption of a purchased Groupon® promotion may also allow the consumer to pay overage amounts and make additional purchases. In the case of a wallet card (e.g., a credit card, a debit card, a charge card), the consumer may or may not be required to load funds onto the wallet card in order for the redemption functionality to work. In addition, the reconciliation process may be initiated following the redemption of a promotion.

Figure 7:
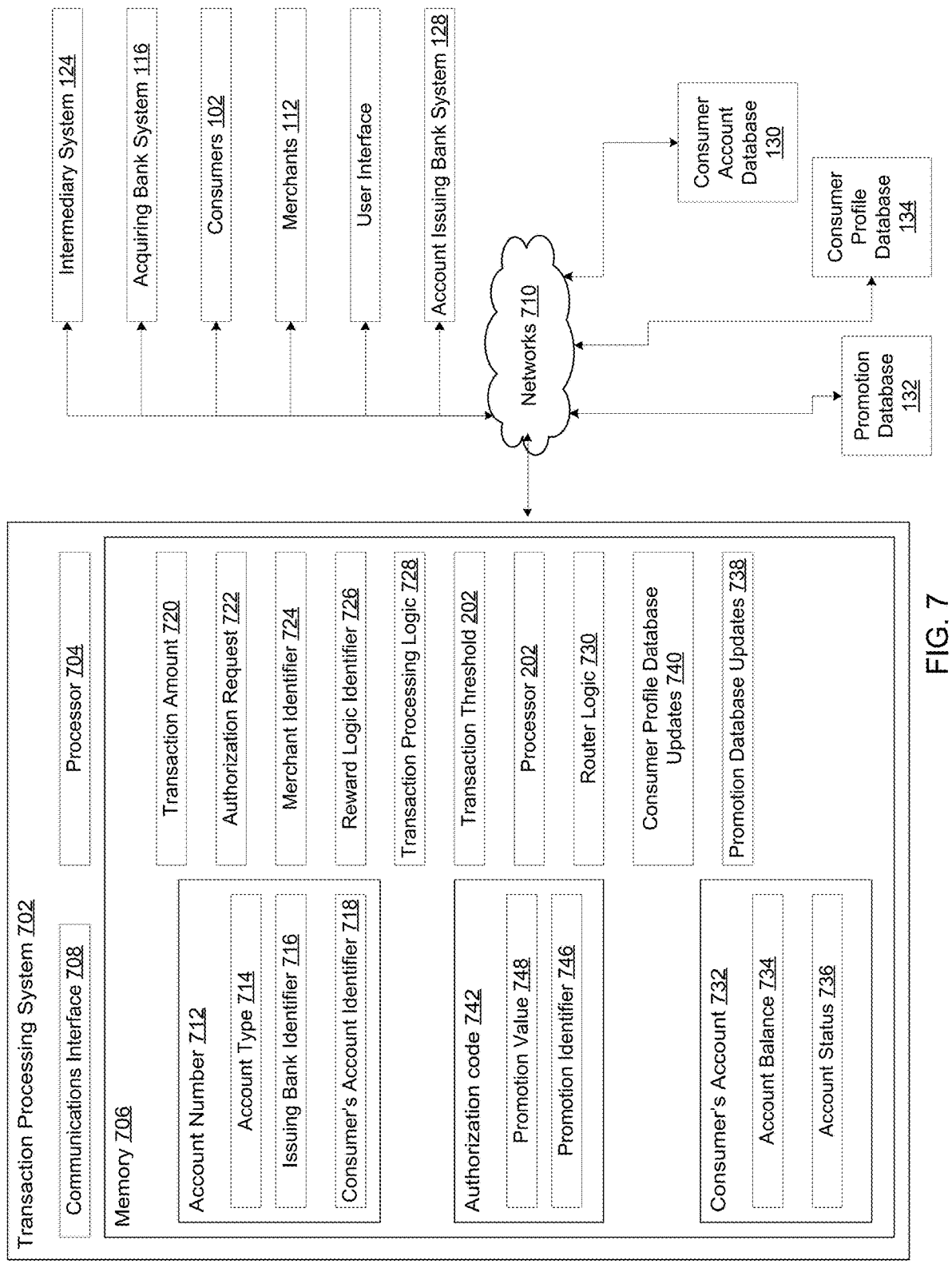
FIG. 7 shows an example transaction processing system configuration.

FIG. 7 shows a transaction processing system configuration 700. The transaction processing system configuration 700 includes the transaction processing system 702. The transaction processing system 702 includes a processor 704 and memory 706 coupled to a communications interface 708 through which the transaction processing system 702 communicates with various components of the transaction processing system configuration 700 in communication through a network 710 (e.g., the Internet). The memory 706 includes an account number 712, when a consumer (e.g., customer) uses a credit card to complete a transaction. The account number 712 identifies the type of card 714, the account issuing bank 716, and the consumer's account identifier 718. The merchant (e.g., merchant system 112) may input the account number 712, and the transaction amount 720 (e.g., using a user interface or point-of-sale system). The merchant system sends a request for authorization 722 to the acquiring bank system in order to obtain authorization for the transaction. The request for authorization 722 may include a merchant identifier 724 (or other type of transaction identifier), the account number 712, optionally a reward logic identifier 726, and the transaction amount 720. The reward logic identifier 726 contains additional data that can be used to process a request for authorization. The acquiring bank system in turn forwards the request for authorization 722 to the intermediary system, which may use a router (e.g., router logic 730) to identify an account issuing bank system corresponding to the account number 712 and to forward the request for authorization 722 to the account issuing bank system 128.

The account issuing bank system 128 maintains up-to-date information on the consumer's account 732 (e.g., account balance 734, and account status 736). The account issuing bank system may maintain a promotion database 132, and a consumer profile database. The merchant system may periodically communicate updates 738 to the promotion database, while the consumer may periodically communicate updates 740 to the consumer profile database.

When one or both of the account number and transaction amount indicate a specific promotion, the account issuing bank system 128 determines whether the customer is authorized for the promotion. In particular, when the request for authorization 722 is indicative of a promotion and the transaction authorization (e.g., authorization code 742) identifies an approval of the transaction 744, the authorization code 742 may be sent authorizing the promotion. In one embodiment, the authorization code 742 may optionally include a promotion identifier 746 and a promotion value 748 that identifies a redeemable value amount for the promotion identified by the promotion identifier 746.

For example, a consumer may dine at a restaurant where the merchant enters the consumer's account number, redeems a promotion for dining at the restaurant (by sending a request for authorization including transaction information such as a card number/transaction amount indicative of the promotion), and subsequently completes a second transaction to pay the remaining balance due for dining at the restaurant.

However, a different payment transaction does not occur in every embodiment herein. In some embodiments, the account number entered in the request for authorization may indicate a promotion while the transaction amount indicates the price for the relevant product or service that the consumer wants to purchase from a merchant. In such embodiments, because the account number indicates the promotion to be redeemed and the transaction amount indicates the actual cost of the transaction, the request for authorization may complete the entire consumer-merchant purchase.

Figure 8:
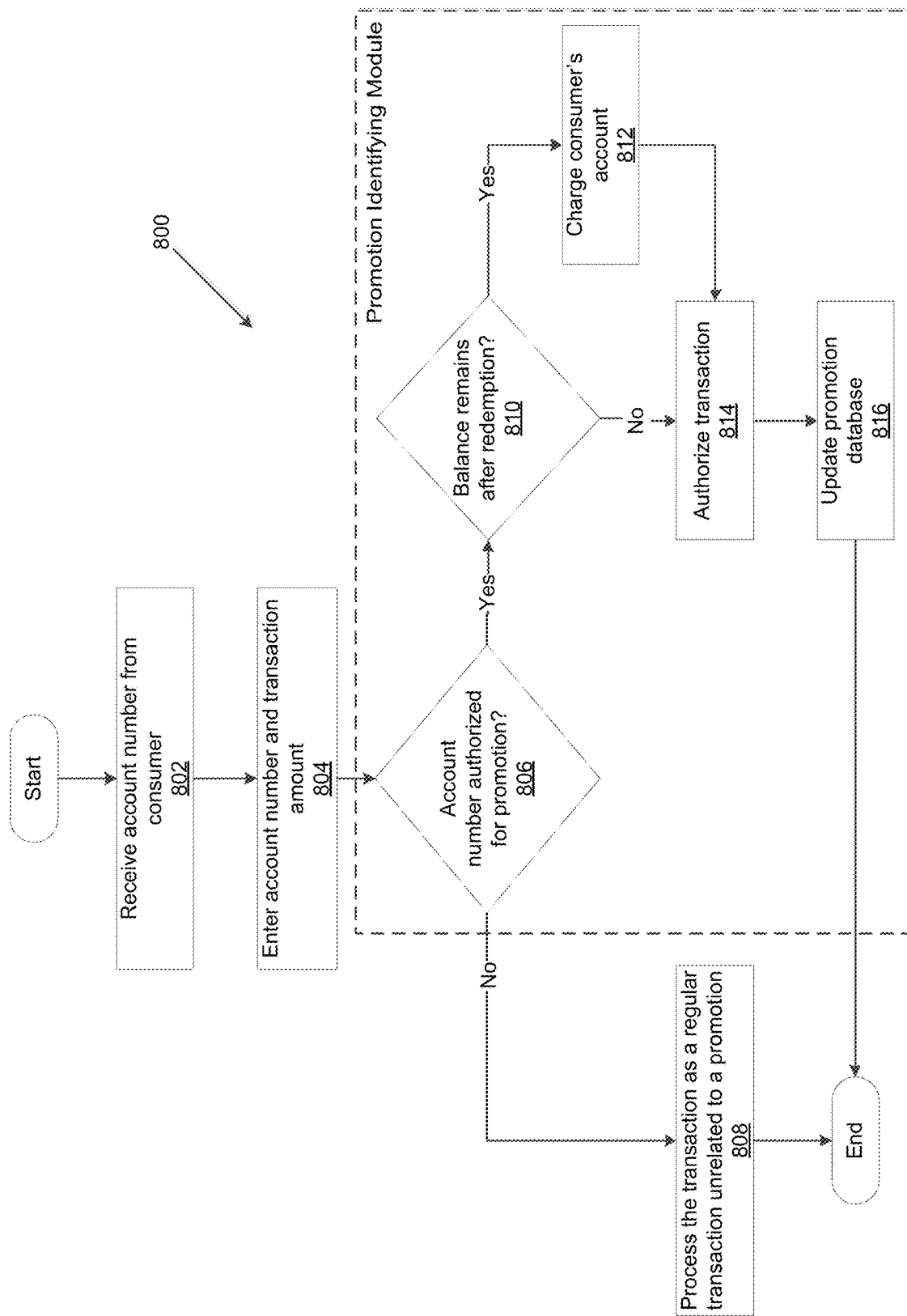
FIG. 8 shows a logic flow including transaction processing logic and a series of operations performed by a promotion identifying module, in accordance with some additional example embodiments.

FIG. 8 illustrates a flow diagram 800 used in conjunction with an example embodiment that uses account numbers to identify promotions with a point-of-sale terminal. Initially, the merchant may receive an account number from the consumer at operation 802. Upon receipt of the account number, the merchant may enter the account number and the cost of the consumer's transaction (as the transaction amount) into a point-of-sale terminal for authorization of the consumer's purchase at operation 804. The request for authorization may then be transmitted by the merchant's system to the acquiring bank system. The acquiring bank system transmits the request for authorization to an intermediary system that identifies the consumer's account issuing bank system 128. As discussed previously, in some embodiments, the account issuing bank system 128 may be the promotion-offering business. The request for authorization is forwarded to the promotion identifying module 146, which may determine whether the account number is correlated with a promotion stored in promotion database 132 at operation 806. If no match can be found, the transaction is processed as a regular transaction unrelated to a promotion, and the account issuing bank system 128 may authorize (or not) the transaction accordingly at operation 808.

However, when the promotion identifying module 146 determines that the account number correlates with a promotion, the promotion identifying module 146 may determine whether a balance remains after redemption of the promotion at operation 810. In this regard, the promotion identifying module 146 may first apply the promotion to the transaction amount, in situations in which the promotion is a discount, rebate, or other means of altering the transaction amount. After application of the promotion, the promotion identifying module 146 may calculate a remaining balance due to the merchant.

If no balance remains, the promotion identifying module 146 may return a transaction authorization comprising an authorization code approving the request, which is sent through the chain of intermediaries to the merchant system 112 at operation 814. Upon receiving authorization of the request sent by the point of sale terminal, the merchant may alert the consumer that the transaction has been completed, and/or take any additional action specified by the promotion (such as, for example, providing the consumer with additional products or services, as dictated by the terms of the promotion).

However, if a balance remains after redemption of the promotion, the promotion identifying module 146 may identify a consumer's account, and charge the consumer's account 130 for the remaining balance at operation 812. Such a charge may be, for example, an electronic funds transfer from a bank account listed in the consumer's account, or a credit transaction using a payment card (such as a credit card or charge card) listed in the consumer's account. Alternatively, the promotion identifying module 146 may relay a message to a promotion-offering business that may perform operation 812. The promotion identifying module 146 may forward payment of the remaining balance to the acquiring bank system 116 to complete the transaction (although this operation may, in some embodiments, be performed prior to charging the consumer's account). The promotion identifying module 146 may authorize the transaction at operation 814.

In the foregoing embodiment, the merchant may receive authorization for a transaction (even if not associated with a promotion or if such transaction exceeds a value for any associated promotion) without requiring a second form of payment from the consumer to complete the transaction (i.e., such second form of payment was pre-registered with the consumer's account). Finally, the promotion identifying module 146 may update the promotion database 132 to reflect that the promotion has been redeemed, in a similar fashion as described above with respect to operation 416 of FIG. 4.

Having described various embodiments of the invention, FIG. 9 illustrates an example demonstrating operation of the transaction processing apparatus in accordance with FIG. 8 above. In this example, a promotion-offering business offers a "$10 for $20" promotion that may be redeemed at a merchant (i.e., paying $10 to purchase the promotion provides $20 worth of credit to a consumer for the purchase of goods or services from the merchant) at operation 901. A consumer purchases the promotion for $10 at operation 902.

Subsequently, the consumer wishes to redeem the promotion when purchasing goods or services from the merchant. At the point-of-sale terminal, the merchant calculates a total purchase price of $75 for the transaction, at which time the consumer notifies the merchant of his/her intent to redeem the previously purchased promotion. In this example, the consumer presents an account number to use for the transaction. From the perspective of the consumer, the merchant enters the account number and the $75 transaction amount and submits a request for authorization at operation 903. The consumer redeems the promotion (operation 904) and acquires the desired goods or services (operation 905). From the consumer's perspective, the transaction is complete.

However, as described in connection with the embodiment disclosed in FIG. 8, the transaction is processed in the following manner. The request for authorization (including transaction information such as the account number provided by the consumer) is routed to a promotion identifying module 146 at operation 903. The promotion identifying module 146 determines whether the account number corresponds to a redeemable promotion. Upon determining that the account number corresponds to a redeemable promotion, the promotion identifying module 146 transmits a transaction authorization that authorizes the transaction at operation 906. In addition, however, the promotion identifying module 146 applies the promotion and calculates a remaining balance, which it (or the promotion-offering business) charges to the consumer's account. In this case, the remaining balance is $55. See operation 904. This balance is subsequently recovered by the promotion identifying module 146 or the promotion-offering business at operation 905.

From the perspective of the merchant, a $75 transaction is captured (operation 907) that otherwise may not have been (i.e., without the incentive offered by the promotion). Finally, the remaining balance is transmitted to the merchant's account at the acquiring bank system 116, so the merchant also receives efficient payment at operation 908.

As disclosed above, the transaction processing system may leverage equipment and infrastructure used by merchants to implement a loyalty rewards program that allows consumers to redeem promotions at multiple participating merchants. In this fashion, the transaction processing system may provide an efficient and effective low-cost way for consumers to redeem promotions with participating merchants.

The system may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory that can communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g., software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the DCBR system 102 may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium may be a non-transitory storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A system, comprising one or more computers and one or more storage devices storing instructions that are operable, when executed by the one or more computers, to cause the one or more computers to:
    establish, using a promotion database, a correlation between a merchant identifier associated with a point of sale terminal, an account number associated with a consumer device, and a promotion identifier associated with a promotion;
    receive, from the point of sale terminal, a request for authorization that comprises the merchant identifier, the account number determined by the point of sale terminal, and a transaction amount, wherein the request for the authorization does not include the promotion identifier, wherein the merchant identifier in combination with the account number facilitates identification of the promotion, and wherein the merchant identifier and the account number are encrypted within the request for the authorization without the promotion identifier;
    query the promotion database using the merchant identifier and the account number included in the request for the authorization to correlate the merchant identifier and the account number to the promotion identifier without communicating with the point of sale terminal for further authentication of the promotion identifier;
    apply the promotion associated with the promotion identifier to the transaction amount to generate a transaction authorization associated with the promotion;
    transmit, to the point of sale terminal, the transaction authorization associated with the promotion to initiate a first action with respect to the point of sale terminal; and
    based on the first action with respect to the point of sale terminal, initiate a second action with respect to the promotion database to modify the correlation associated with the promotion database.

2. The system of claim 1, wherein the account number corresponds to a payment card number, and wherein the one or more storage devices store instructions that are operable, when executed by the one or more computers, to further cause the one or more computers to:
    further employ at least a portion of the payment card number included in the request for the authorization to query the promotion database.

3. The system of claim 1, wherein the account number corresponds to a consumer account identifier, and wherein the one or more storage devices store instructions that are operable, when executed by the one or more computers, to further cause the one or more computers to:
    further employ at least a portion of the consumer account identifier included in the request for the authorization to query the promotion database.

4. The system of claim 1, wherein the account number corresponds to a promotion code associated with a duration of time, and wherein the one or more storage devices store instructions that are operable, when executed by the one or more computers, to further cause the one or more computers to:
    determine whether the duration of time is less than or equal to a predefined threshold time value; and
    in response to a determination that the duration of time is less than or equal to the predefined threshold time value, query the promotion database using the merchant identifier and the account number included in the request for the authorization.

5. The system of claim 1, wherein the one or more storage devices store instructions that are operable, when executed by the one or more computers, to further cause the one or more computers to:
    establish the correlation between the merchant identifier, the account number, and the promotion identifier in response to a redemption transaction generated via the consumer device.

6. The system of claim 5, wherein the one or more storage devices store instructions that are operable, when executed by the one or more computers, to further cause the one or more computers to:
    in response to establishment of the correlation between the merchant identifier, the account number, and the promotion identifier, transmit the account number to the consumer device.

7. The system of claim 1, wherein the one or more storage devices store instructions that are operable, when executed by the one or more computers, to further cause the one or more computers to:
receive the request for authorization in response to an electronic indication of the account number being received via the point of sale terminal.

8. The system of claim 1, wherein the one or more storage devices store instructions that are operable, when executed by the one or more computers, to further cause the one or more computers to:
receive the request for authorization in response to a digital representation of the account number being received via a reader device of the point of sale terminal.

9. The system of claim 1, wherein the one or more storage devices store instructions that are operable, when executed by the one or more computers, to further cause the one or more computers to:
calculate a remaining balance value for the promotion based on the transaction amount; and
generate the transaction authorization based on the remaining balance value.

10. The system of claim 1, wherein the one or more storage devices store instructions that are operable, when executed by the one or more computers, to further cause the one or more computers to:
calculate a remaining balance value for the promotion based on the transaction amount; and
modify the correlation based on the remaining balance value.

11. A computer-implemented method, comprising:
establishing, by a device comprising a processor and using a promotion database, a correlation between a merchant identifier associated with a point of sale terminal, an account number associated with a consumer device, and a promotion identifier associated with a promotion;
receiving, by the device and from the point of sale terminal, a request for authorization that comprises the merchant identifier, the account number determined by the point of sale terminal, and a transaction amount, wherein the request for the authorization does not include the promotion identifier, wherein the merchant identifier in combination with the account number facilitates identification of the promotion, and wherein the merchant identifier and the account number are encrypted within the request for the authorization without the promotion identifier;
querying, by the device, the promotion database using the merchant identifier and the account number included in the request for the authorization to correlate the merchant identifier and the account number to the promotion identifier without communicating with the point of sale terminal for further authentication of the promotion identifier;
applying, by the device, the promotion associated with the promotion identifier to the transaction amount to generate a transaction authorization associated with the promotion;
transmitting, by the device and to the point of sale terminal, the transaction authorization associated with the promotion to initiate a first action with respect to the point of sale terminal; and
based on the first action with respect to the point of sale terminal, initiating, by the device, a second action with respect to the promotion database to modify the correlation associated with the promotion database.

12. The computer-implemented method of claim 11, wherein the account number corresponds to a payment card number, and wherein the querying the promotion database comprises querying the promotion database using at least a portion of the payment card number included in the request for the authorization.

13. The computer-implemented method of claim 11, wherein the account number corresponds to a consumer account identifier, and wherein the querying the promotion database comprises querying the promotion database using at least a portion of the consumer account identifier included in the request for the authorization.

14. The computer-implemented method of claim 11, wherein the account number corresponds to a promotion code associated with a duration of time, and wherein the computer-implemented method further comprises:
determining, by the device, whether the duration of time is less than or equal to a predefined threshold time value; and
in response to determining that the duration of time is less than or equal to the predefined threshold time value, querying the promotion database using the merchant identifier and the account number included in the request for the authorization.

15. The computer-implemented method of claim 11, wherein the establishing comprises establishing the correlation between the merchant identifier, the account number, and the promotion identifier in response to a redemption transaction generated via the consumer device.

16. The computer-implemented method of claim 15, further comprising:
transmitting, by the device, the account number to the consumer device in response to establishing the correlation between the merchant identifier, the account number, and the promotion identifier.

17. The computer-implemented method of claim 11, wherein the receiving the request for authorization comprises receiving the request for authorization in response to an electronic indication of the account number being received via the point of sale terminal.

18. A computer program product, comprising a non-transitory computer readable medium, comprising instructions that when executed by one or more computers cause the one or more computers to:
establish, using a promotion database, a correlation between a merchant identifier associated with a point of sale terminal, an account number associated with a consumer device, and a promotion identifier associated with a promotion;
receive, from the point of sale terminal, a request for authorization that comprises the merchant identifier, the account number determined by the point of sale terminal, and a transaction amount, wherein the request for the authorization does not include the promotion identifier, wherein the merchant identifier in combination with the account number facilitates identification of the promotion, and wherein the merchant identifier and the account number are encrypted within the request for the authorization without the promotion identifier;
query the promotion database using the merchant identifier and the account number included in the request for the authorization to correlate the merchant identifier and the account number to the promotion identifier without communicating with the point of sale terminal for further authentication of the promotion identifier;

apply the promotion associated with the promotion identifier to the transaction amount to generate a transaction authorization associated with the promotion;

transmit, to the point of sale terminal, the transaction authorization associated with the promotion to initiate a first action with respect to the point of sale terminal; and based on the first action with respect to the point of sale terminal, initiate a second action with respect to the promotion database to modify the correlation associated with the promotion database.

19. The computer program product of claim 18, wherein the account number corresponds to a promotion code associated with a duration of time, and the computer program product further comprising instructions that when executed by the one or more computers cause the one or more computers to:

determine whether the duration of time is less than or equal to a predefined threshold time value; and in response to a determination that the duration of time is less than or equal to the predefined threshold time value, query the promotion database using the merchant identifier and the account number included in the request for the authorization.

20. The computer program product of claim 18, further comprising instructions that when executed by the one or more computers cause the one or more computers to:

establish the correlation between the merchant identifier, the account number, and the promotion identifier in response to a redemption transaction generated via the consumer device.

* * * * *